US012654796B2

(12) United States Patent
Halvorson

(10) Patent No.: US 12,654,796 B2
(45) Date of Patent: Jun. 16, 2026

(54) SNOWMOBILE HOOD

(71) Applicant: Arctic Cat Inc., Thief River Falls, MN (US)

(72) Inventor: Erick John Halvorson, Albany, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/672,302

(22) Filed: May 23, 2024

(65) Prior Publication Data

US 2024/0308611 A1 Sep. 19, 2024

Related U.S. Application Data

(63) Continuation of application No. 17/229,969, filed on Apr. 14, 2021, now Pat. No. 12,017,721.

(60) Provisional application No. 63/021,361, filed on May 7, 2020.

(51) Int. Cl.
B62J 17/086 (2020.01)
B62J 6/027 (2020.01)

(52) U.S. Cl.
CPC ............. B62J 17/086 (2020.02); B62J 6/027 (2020.02)

(58) Field of Classification Search
CPC ...... B62M 2027/027; B62M 2027/026; B62M 2027/028; B62M 2027/023; B62D 21/183; B62J 6/027; B62J 17/086
See application file for complete search history.

(56) References Cited

U.S. PATENT DOCUMENTS

| | | | |
|---|---|---|---|
| 2,656,904 A | 10/1953 | Wilfrid | |
| 3,760,895 A | 9/1973 | Martinmaas | |
| 3,915,563 A * | 10/1975 | Zimmer .................... | B60R 1/06 |
| | | | 359/871 |
| 4,135,470 A | 1/1979 | Ono | |
| 5,886,627 A | 3/1999 | Brady et al. | |
| 6,880,658 B2 * | 4/2005 | Fournier ............... | B62M 27/02 |
| | | | 180/190 |
| 6,926,107 B2 * | 8/2005 | Nishijima .............. | B62M 27/02 |
| | | | 180/190 |
| 7,124,845 B2 * | 10/2006 | Pyykonen .............. | B62M 27/02 |
| | | | 180/190 |
| 7,413,046 B2 | 8/2008 | Okada et al. | |
| 7,708,097 B1 * | 5/2010 | Tharaldson ............ | B62M 27/02 |
| | | | 180/190 |
| 9,174,702 B1 | 11/2015 | Gauthier et al. | |
| 2001/0027886 A1 | 10/2001 | Ishii | |
| 2004/0237927 A1 * | 12/2004 | Morii ........................ | F02F 1/40 |
| | | | 123/193.5 |
| 2005/0006167 A1 | 1/2005 | Bertrand et al. | |
| 2006/0102403 A1 | 5/2006 | Inoguchi et al. | |

(Continued)

*Primary Examiner* — Zheng Song

(74) *Attorney, Agent, or Firm* — Billion & Armitage

(57) ABSTRACT

A snowmobile includes a frame, at least one ski, a seat, a handlebar connected to the at least one ski via a steering shaft, and a single-piece hood. The single-piece hood includes a forward position located approximately equal to a first horizontal plane, a lower portion that extends rearwardly from the forward position and a top portion that extends rearwardly from the forward position, wherein the bottom portion is located beneath the first horizontal plane and the top portion is located above the first horizontal plane.

20 Claims, 6 Drawing Sheets

(56)                     References Cited

U.S. PATENT DOCUMENTS

| | | | |
|---|---|---|---|
| 2006/0175106 A1* | 8/2006 | Vaisanen | B62M 27/00 |
| | | | 180/190 |
| 2007/0089920 A1* | 4/2007 | Kelahaara | B62M 27/02 |
| | | | 180/190 |
| 2007/0193800 A1 | 8/2007 | Yatagai et al. | |
| 2018/0186430 A1 | 7/2018 | Vigen | |
| 2021/0131366 A1 | 5/2021 | Blake et al. | |
| 2021/0188182 A1 | 6/2021 | Edwards et al. | |
| 2021/0188381 A1 | 6/2021 | Hedlund | |
| 2021/0215093 A1 | 7/2021 | Buchwitz et al. | |
| 2022/0212754 A1 | 7/2022 | Stock et al. | |

* cited by examiner

SNOWMOBILE HOOD

BACKGROUND

Various types of snow vehicles are known in the art. A hood assembly is utilized to at least partially surround the engine and associated components. Typically, this may require a plurality of hood assembly components each connected separately to the frame or to one another.

SUMMARY

According to some aspects, a snowmobile includes a frame, at least one ski, a seat, a handlebar connected to the at least one ski via a steering shaft, and a single-piece hood. The single-piece hood includes a forward position located approximately equal to a first horizontal plane, a lower portion that extends rearwardly from the forward position and a top portion that extends rearwardly from the forward position, wherein the bottom portion is located beneath the first horizontal plane and the top portion is located above the first horizontal plane.

According to another aspect, a single-piece hood includes an upper portion and a lower portion. The lower portion extends rearward and downward from a forward position associated with the single-piece hood and is defined by a first number of planes. The upper portion extends rearward and upward from a forward position associated with the single-piece hood and is defined by a second number of planes. Each of the first number of planes are located at a positive angle relative to an angle of draw and wherein each of the second plurality of surfaces are located at a positive angle relative to the angle of draw.

DETAILED DESCRIPTION

Figure 1:
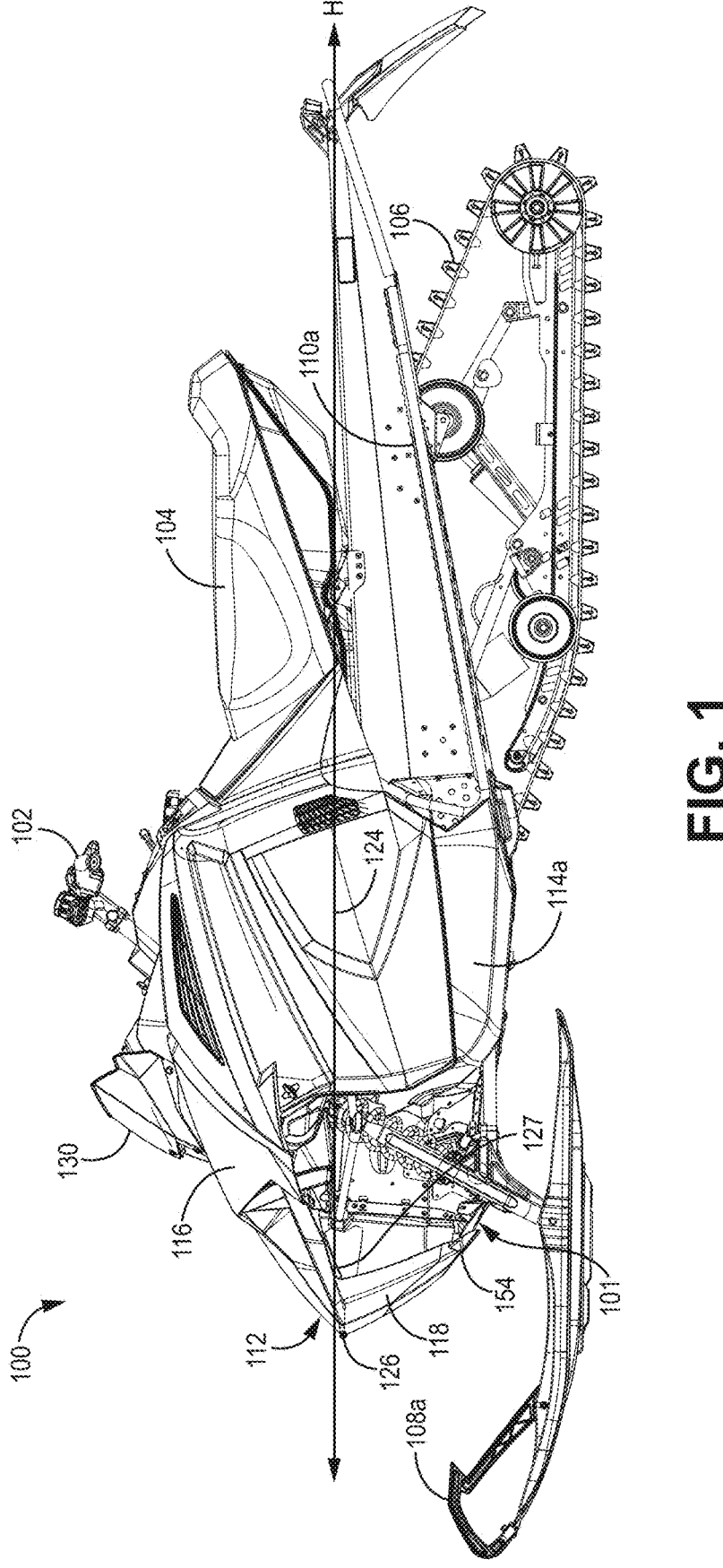
FIG. 1 is a side view of a snowmobile having a one-piece hood assembly according to some embodiments.

Disclosed herein is a snowmobile having a single-piece hood assembly. In some embodiments, the single-piece hood assembly is defined by a nose cone located at a forward location of the hood assembly. A horizontal plane extending through the forward position of the nose cone divides the hood assembly into a lower portion and an upper portion. The lower portion extends rearwardly (and downward) from the forward position and an upper portion extends rearwardly (and upward) from the forward position, wherein the lower portion is located beneath the horizontal plane and wherein the upper portion is located above the horizontal plane. The lower portion is connected to the frame at a position rearward of the forward position. The upper portion of the hood assembly extends longitudinally rearward to a position approximately adjacent to the handlebars of the snowmobile.

In some aspects, the lower portion is defined by surfaces that extend along a first number of planes. Likewise, the upper portion is defined by surfaces that extend along a second number of planes. The first number of planes and the second number of planes are located at a positive angle relative to another (i.e., angle greater than parallel). In some embodiments, the hood assembly is manufactured via an injection molding process. The line of draw is an axis that defines the direction along which the two mold components will separate to remove the part (in this case, the hood). The first number of planes are located at a positive angle relative to the line of draw and the second number of planes are also located at a positive angle relative to the line of drawn. In this way, a single-piece hood assembly can be fabricated that includes a lower portion extending rearwardly from a forward position and an upper portion extending rearwardly from a forward position (creating an undercut typically difficult to manufacture as a single piece).

Referring now to FIGS. 1-5, a snowmobile 100 is provided that includes a one-piece hood assembly 112 according to some embodiments. In general, the snowmobile 100 comprises a frame 101, a set of handlebars 102, a seat 104, a track 106, at least one ski 108a, 108b, at least one footrest 110a, 110b, the one-piece hood assembly 112, and first and second side panels 114a, 114b. In the embodiment shown in FIG. 1, the one-piece hood assembly 112 (hereinafter, hood assembly 112) includes an upper portion 116 and a lower portion 118. The hood assembly 112 includes a nose cone that defines a forward most position 126 of the hood assembly 112. The upper portion 116 and the lower portion 118 meet—so to speak—at the forward position 126 of the hood assembly 112. In the embodiment shown in FIG. 1, a horizontal plane 124 is drawn through the forward position 126, wherein the lower portion 118 is defined as being located beneath the horizontal plane 124 and the upper portion 116 is defined as being located above the horizontal plane 124. From the forward position 126, the lower portion 118 extends rearwardly and downward toward the frame 101. Similarly, from the nose 126 the upper portion 116 extends rearwardly and upward towards the handlebars 102 and seating area 104. The geometry of the upper portion 116 and the lower portion 118 provides an undercut 127. In some embodiments, the undercut 127 is located approximately along the horizontal plane 124.

In some embodiments, the lower portion 118 is secured to the frame 101 via one or more bolt holes 154 associated with hood assembly 112, which is rearward of the forward position or nose 126 and in some embodiments is rearward of undercut 127. For example, in some embodiments (shown in FIG. 4) the lower portion 118 of the hood assembly 112 includes a bolt hole 154 configured to receive a fastener (e.g., bolt) to secure the lower portion 118 to the frame 101 via bolt hole 156 (shown in FIG. 4). In some embodiments, the bolt hole 154 is positioned within a groove that allows the received bolt to be angled at approximately the same angle as the lower portion 118 (i.e., rearward and downward). Likewise, the bolt hole 156 included on the bulkhead associated with frame 101 is configured to receive a bolt provided at the same angle (i.e., rearward and downward). In some embodiments, the lower portion 118 extends downwardly to a position approximately equal with a bottom portion of the frame 101. In some embodiments, the lower portion 118 extends downwardly to a position beneath the bottom portion of the frame 101. In some embodiments, the hood assembly 112 provides protection for the engine and other components located interior of the hood assembly 112. A benefit of the lower portion 118 extending downwardly to a position approximately equal to or beneath the bottom portion of the frame 101 is that the hood assembly 112 provides improved protection for the engine and associated components.

Figure 2:
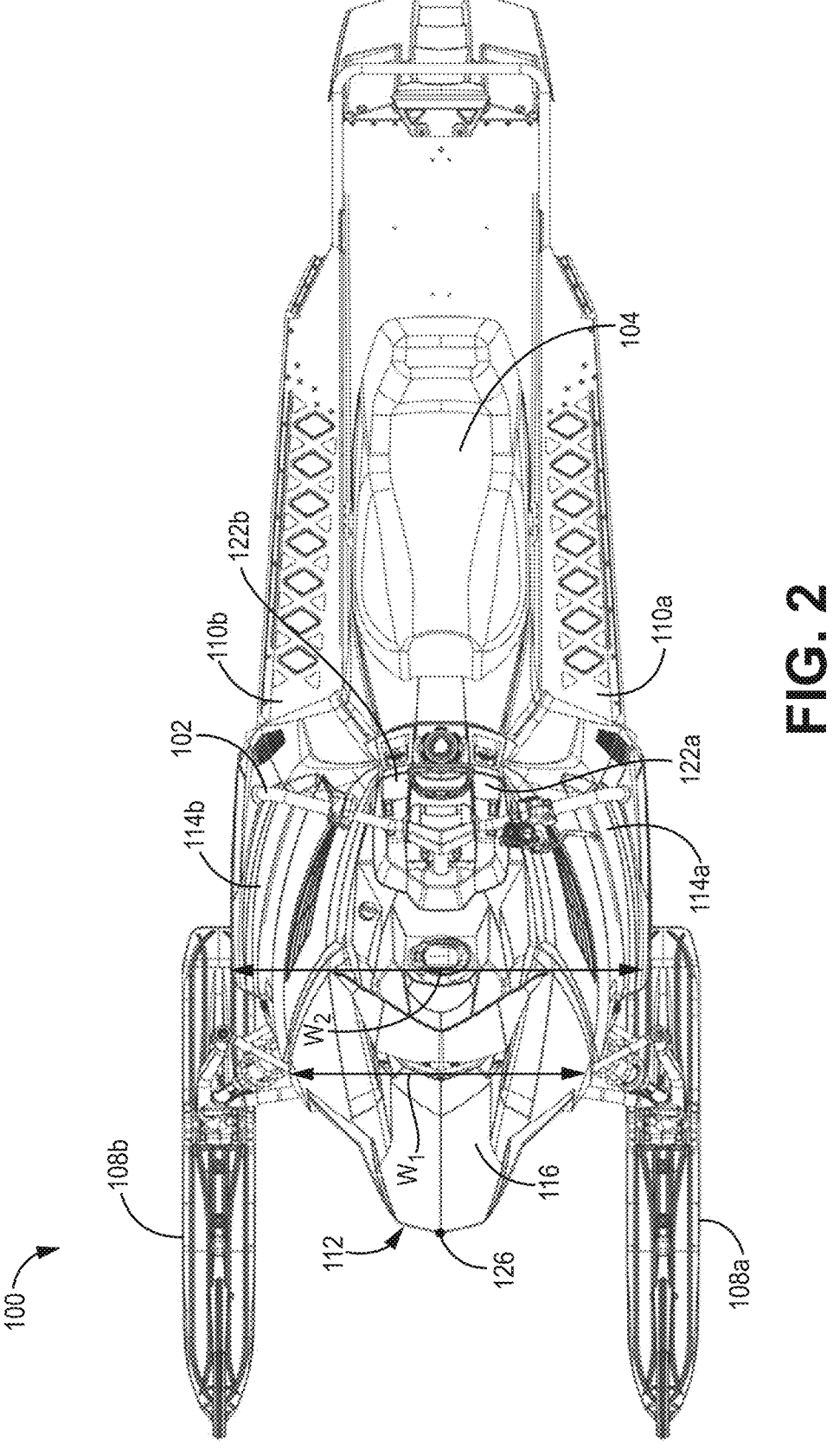
FIG. 2 is a top view of a snowmobile having a one-piece hood assembly according to some embodiments.
Figure 3:
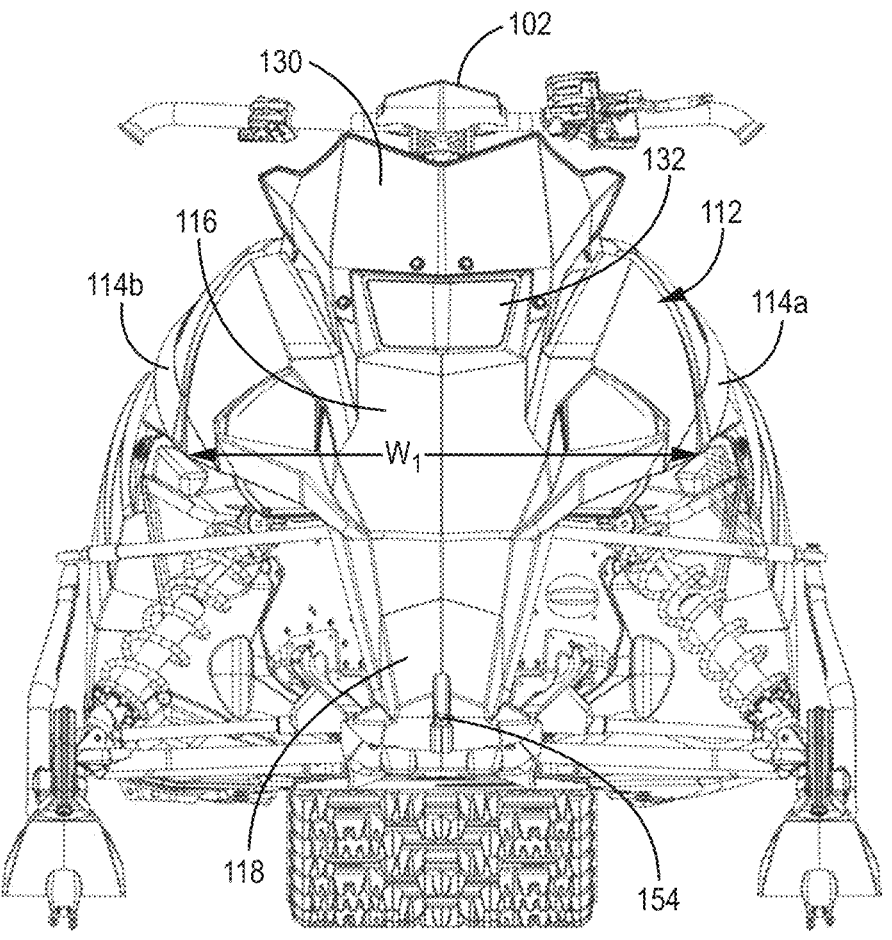
FIG. 3 is a front view of a snowmobile having a one-piece hood assembly according to some embodiments.

In some embodiments, the upper portion 116 of the hood assembly 112 extends from the forward position 126 rearward to a position approximately equal to or rearward of the handlebars 102 (as shown in FIG. 2). In some embodiments, the upper portion 116 includes a notch or aperture defined by arms 122*a* and 122*b* which extend rearward of the steering shaft/column 157 (shown in FIG. 4). In some embodiments, arms 122*a* and 122*b* of upper portion 116 extend rearward of handlebars 102. In some embodiments, the upper portion 116 includes one or more bolt holes 152 configured to fasten the hood assembly 112 to the frame 101.

In some embodiments, the width of the hood assembly 112 is defined by width $w_1$ as shown in FIG. 2. In some embodiments, the width of the body of the snowmobile 100 (including first and second side panels 114*a* and 114*b*) is defined by width $w_2$. In some embodiments, the width w is greater than 50% of the width $w_2$. In some embodiments, the width $w_1$ is greater than 75% of the width $w_2$.

Figure 4:
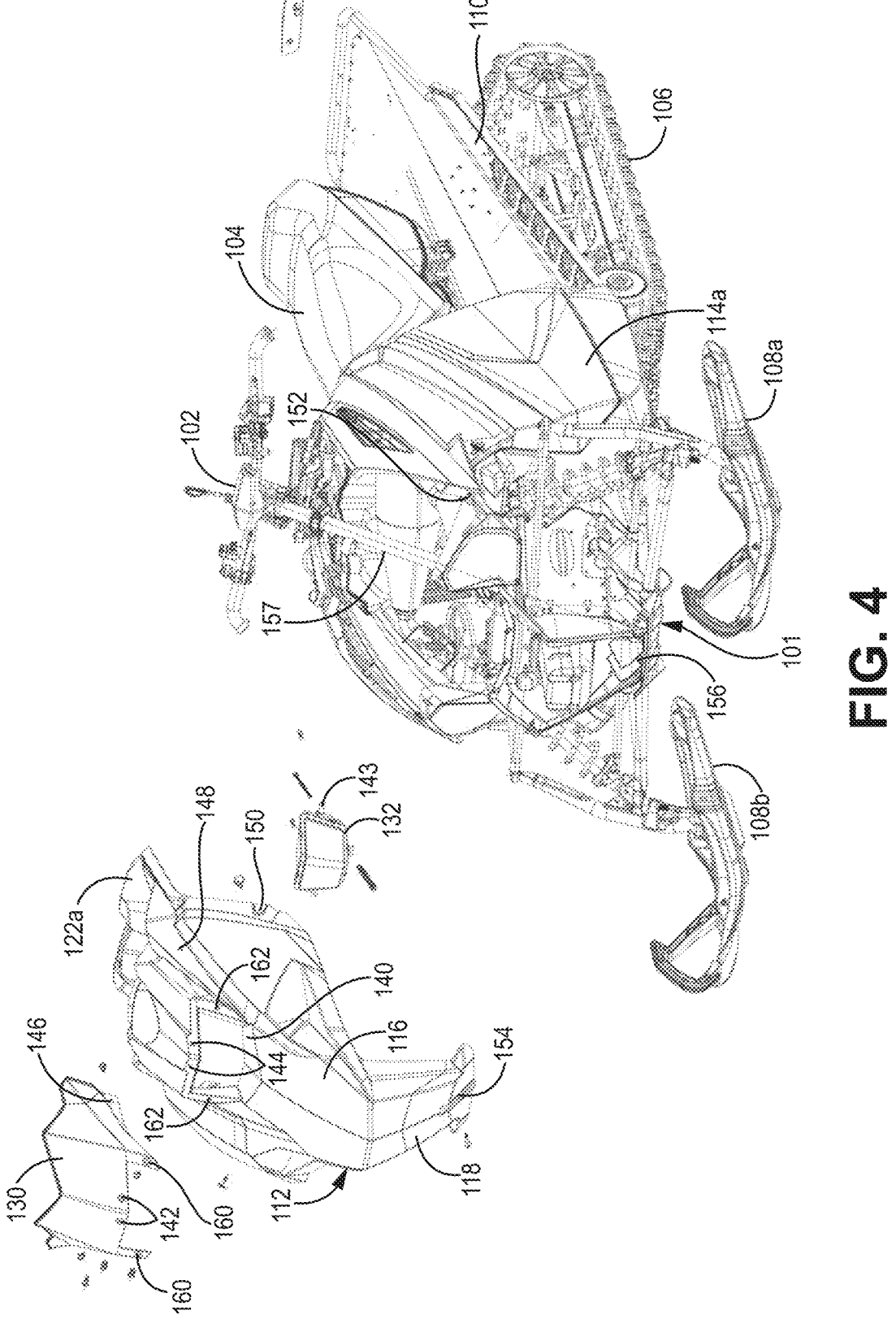
FIG. 4 is an exploded view of the hood assembly, windshield and headlight assembly according to some embodiments.
Figure 5:
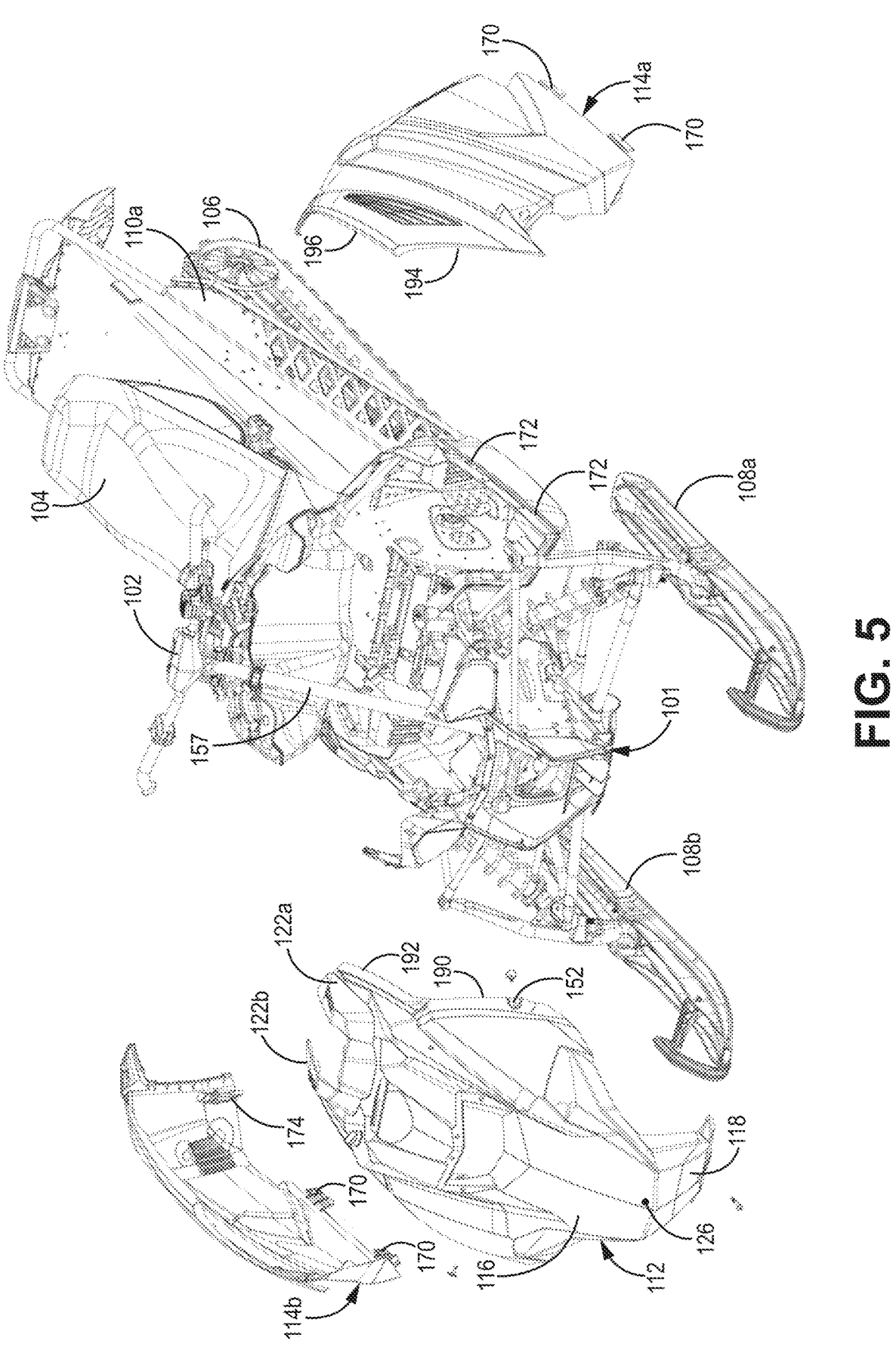
FIG. 5 is an exploded view of the hood assembly and side panel assemblies according to some embodiments.

In some embodiments, windshield 130 is secured to the upper portion 116 of the hood assembly 112. For example, as shown in FIG. 4, upper portion 116 includes an aperture 140 configured to receive headlight assembly 132. A pair of bolt holes 144 are located above the aperture 140 and a pair of bolt holes 162 are located on opposite sides (i.e., left and right) of the aperture 140. Likewise, windshield assembly 130 includes a pair of bolt holes 142 and 160 configured to secure windshield assembly 130 to the corresponding bolt holes in the upper portion 116. In some embodiments, headlight assembly 132 includes a pair of bolt holes 143 located on opposite sides of the headlight assembly 132. In some embodiments, the same bolt utilized to secure the windshield assembly 130 to the upper portion 116 is utilized to secure the headlight assembly 132 to the upper portion 116 (i.e., bolt holes 160, 143, and 162 will be aligned with one another. In other embodiments, the headlight assembly 132 may be secured separately to the upper portion 116 of the hood assembly 112. As shown in some embodiments, the upper portion 116 extends rearward of the windshield assembly 130 and extends to either side of the handlebars 102 and steering shaft 157.

As shown in FIGS. 1-3 and 5, snowmobile 100 includes first and second side panels 114*a* and 114*b*. In some embodiments, the upper portion 116 includes a first edge 190 and a second edge 192 that is configured to align with a first edge 194 and a second edge 196, respectively, of first side panel 114*a* (and likewise, with second side panel 114*b*). In some embodiments, each side panel 114*a*, 114*b* includes a pair of tabs 170 configured to engage with a pair of grooves 172 for securing the side panel to the frame 101. In some embodiments, one or more fasteners (e.g., bolts) are also utilized to secure the first and second side panels 114*a*, 114*b* to the frame 101.

Figures 6, 7:
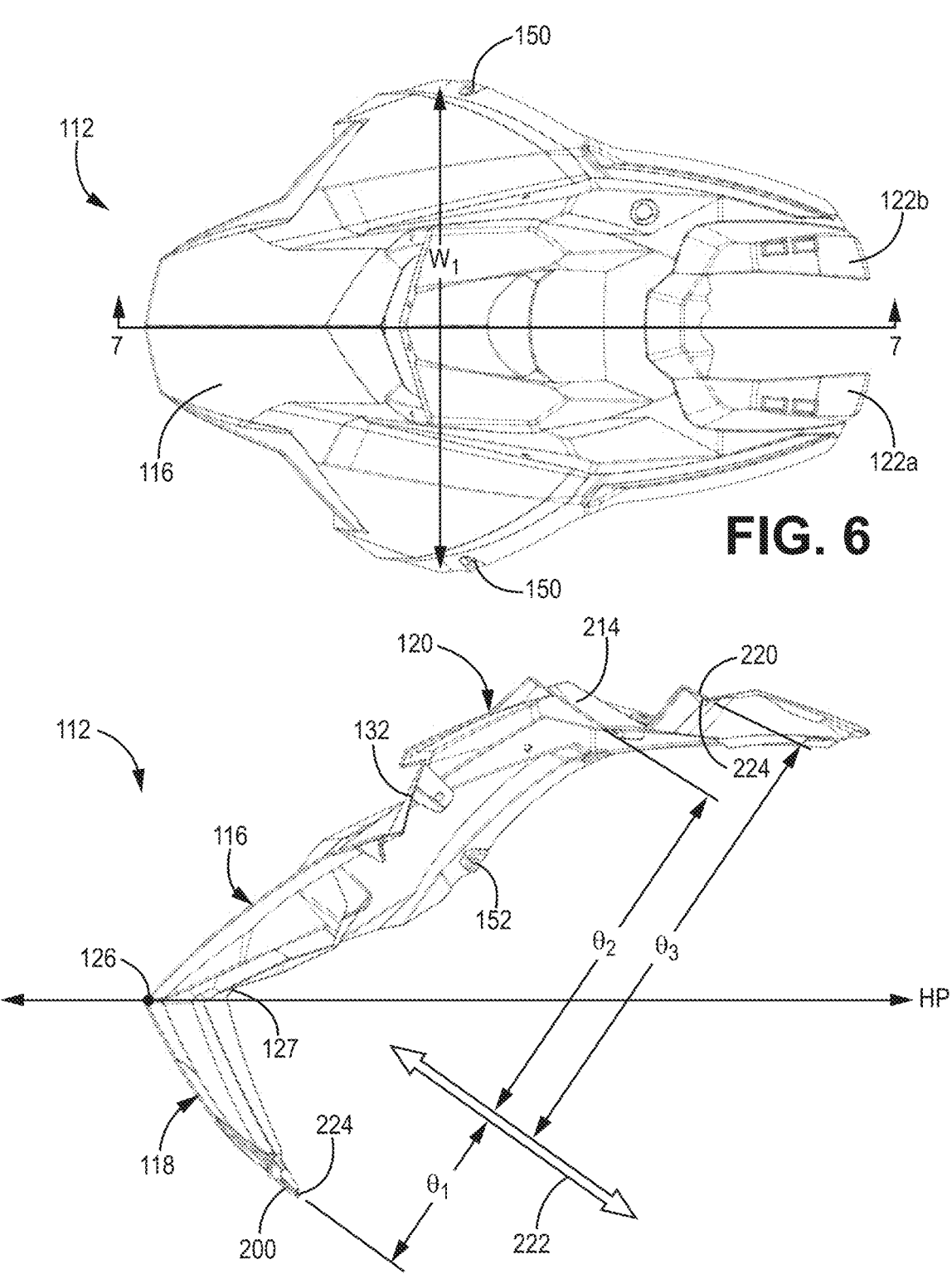
FIG. 6 is a top view of the hood assembly according to some embodiments.
FIG. 7 is a cross-sectional view taken along line 7-7 in FIG. 6 according to some embodiments.

Referring now to FIGS. 6 and 7, the hood assembly 112 is shown in additional detail. In particular, FIG. 6 is a top view of the hood assembly 112 and FIG. 7 is a cross-sectional view taken along line 7-7 shown in FIG. 6. In the top view shown in FIG. 6, only the upper portion 116 of the hood assembly 112 is visible, wherein lower portion 118 is hidden from view. In some embodiments, the top portion 116 includes a notch defined by arms 122*a* and 122*b*. As described above the notch defined by arms 122*a* and 122*b* allows the hood assembly 112 to extend rearward of the steering shaft 157.

In some embodiments, the hood assembly 112 is a single, integral piece. In some embodiments, the hood assembly 112 is manufactured using an injection molding process in which the geometry of the hood assembly 112 is defined within a pair of molds (not shown). After cooling, the pair of molds are opened by moving one or both molds in a direction referred to as the line of draw as indicated by arrow 222. For this type of manufacturing process, it is important than all surfaces are located at a positive angle relative to the line of draw 222. For example, a surface that extends in the same direction as the line of draw 222 (i.e., parallel to the line of draw) would have a neutral angle (i.e., zero angle). A surface that extends in a positive direction provides sufficient draft to allow the mold to move along the line of draw 222. Despite the hood assembly 112 including an undercut 127 (typically problematic for injection molding processes), each surface associated with the hood assembly 112 presents a positive angle relative to the line of draw 222, including surfaces associated with the lower portion 118 and upper portion 116. For example, the surface 200 associated with lower portion 118 is located at an angle $\theta_1$ relative to the line of draw 222, and is positive (i.e., greater than zero). In some embodiments, the angle $\theta_1$ is equal to approximately 2° 30'. In another example, the surface 214 associated with the upper portion 116 is located at an angle $\theta_2$ relative to the line of draw 222, and is positive (i.e., greater than zero). In some embodiments, the angle $\theta_2$ is equal to approximately 2°. Likewise, the surface 220 associated with the upper portion 116 is located at an angle $\theta_3$ relative to the line of draw 222, and is positive (i.e., greater than zero). In some embodiments, the angle $\theta_3$ is equal to approximately 9° 30'. In this way, the geometry of the hood assembly 112 allows the hood to be manufactured using an injection molding technique that provides a single-piece or integrated hood. At the same time, the geometry of the hood assembly 112 allows the single-piece hood to include an undercut associated with the geometry of the lower portion 118 and the upper portion 116 of the hood assembly 112.

In addition, in some embodiments the geometry of the hood assembly 112 allows the line of draw 222 to be taken approximately perpendicular with the forward or top portion of the hood assembly (i.e., the portion visible to a user from the front of the snowmobile 100). As a result, the parting line (i.e., the position along the hood assembly 112 where the respective molds meet during the injection molding process) is located on the bottom of the part as indicated by line 224 located on both the lower portion 118 and the upper portion 116. A benefit of this approach is that the parting line 224 is not easily visible once the hood assembly 112 is installed on the snowmobile 100.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A snowmobile comprising:
a frame;
at least one ski;
a seat;
handlebars connected to the at least one ski via a steering shaft; and
a single-piece hood having a forward position located at a first horizontal plane, a lower portion that extends rearwardly from the forward position and a top portion that extends rearwardly from the forward position,
wherein the lower portion is located beneath the first horizontal plane and the top portion is located above the first horizontal plane, the lower portion and the top portion formed as a single integral piece, the top portion and the lower portion in fixed relation to one another, the top portion fixedly attached to the frame and the lower portion fixedly attached to the frame, the top portion and the lower portion forming an angle with one another in a range from 85 to 100 degrees, the lower portion of the single-piece hood extending downwardly to a position approximately equal to a bottom portion of the frame,
wherein the single-piece hood is an injection molded piece having:
a positive angle with respect to a line of draw associated with the horizontal plane in the range of 2.5 degrees to 9.5 degrees; and
a parting line located on a bottom portion of the single-piece hood.

2. The snowmobile of claim 1, wherein the lower portion of the single-piece hood extends downwardly to a position beneath a bottom portion of the frame and is connected to the frame at a position rearward of the forward position.

3. The snowmobile of claim 1, wherein the top portion extends rearwardly to a position longitudinally adjacent to the handlebars.

4. The snowmobile of claim 1, further including a first side panel and a second side panel, wherein the first side panel extends alongside the single-piece hood and wherein the second side panel extends alongside the single-piece hood.

5. The snowmobile of claim 4, wherein the single-piece hood is defined by a first width and wherein the snowmobile is defined by a second width, wherein the first width is at least 75% of the second width.

6. The snowmobile of claim 1, wherein the lower portion of the hood is defined by surfaces that extend along a first number of planes and wherein the top portion of the hood is defined by surfaces that along a second number of planes.

7. The snowmobile of claim 6, wherein the surfaces of the first number of planes are located at a positive angle relative to a horizontal plane including an axis of draw and wherein the surfaces of the second number of planes are located at a positive angle relative to the horizontal plane including the axis of draw, the axis of draw intersecting the first horizontal plane.

8. The snowmobile of claim 7, wherein the positive angle with respect to a line of draw associated with the horizontal plane in the range of 2.0 degrees to 7.5 degrees.

9. The snowmobile of claim 7, wherein the first number of planes are located at a positive angle relative to an axis of draw in the range from 2.5 degrees to 9.0 degrees and wherein the second number of planes are located at a positive angle relative to the axis of draw in the range from 2.5 degrees to 9.0 degrees.

10. The snowmobile of claim 7, wherein the first number of planes are located at a positive angle relative to an axis of draw in the range from 3.0 degrees to 8.5 degrees and wherein the second number of planes are located at a positive angle relative to the axis of draw in the range from 3.0 degrees to 8.5 degrees.

11. The snowmobile of claim 6, wherein the first number of planes are located at a positive angle relative to the second number of planes.

12. The snowmobile of claim 1, wherein the parting line is located on a bottom portion of the top portion.

13. A single-piece hood comprising:
a single piece portion including:
a lower portion having a plurality of surfaces defined along a first number of planes, wherein the lower portion extends rearward and downward from a forward position;
an upper portion having a plurality of surfaces defined along a second number of planes, wherein the upper portion extends rearward and upward from the forward position, the lower portion and the upper portion formed as a single integral piece, the upper portion and the lower portion in fixed relation to one another and forming an angle with one another in a range from 85 to 100 degrees;
wherein each of the first number of planes are located at a positive angle relative to a line of draw and wherein each of the second plurality of surfaces are located at a positive angle relative to the line of draw and wherein the single-piece hood has an undercut near the intersection of the lower portion and the upper portion; and
a first side piece having:
an edge attachable to the upper portion; and
a second side piece having:
an edge attachable to the upper portion,
wherein the single-piece portion is an injection molded piece having:
a positive angle with respect to a line of draw associated with a horizontal plane extending through the forward position in a range of 2.5 degrees to 9.5 degrees; and
a parting line located on a bottom portion of the single-piece hood.

14. The single-piece hood of claim 13, wherein the upper portion includes an aperture for receiving a headlight assembly.

15. The single-piece hood of claim 13, wherein the upper portion includes a first arm portion and a second arm portion defining a notch extending rearward from a steering column and handlebar assembly.

16. The single-piece hood of claim 13, further including a forward position located at a first horizontal plane where the upper portion and the lower portion meet, the single-piece hood having an undercut therein.

17. The single-piece hood of claim 13, further including a forward position located at a first horizontal plane where the upper portion and the lower portion meet, the single-piece hood having an undercut therein located along the horizontal plane.

18. The snowmobile of claim 13, wherein the parting line is located on a bottom portion of the lower portion.

19. A snowmobile comprising:
a frame;
at least one ski;
a seat;

handlebars connected to the at least one ski via a steering shaft; and a single-piece hood having a forward position located at a first horizontal plane, a lower portion that extends rearwardly from the forward position and a top portion that extends rearwardly from the forward position, wherein the lower portion is located beneath the first horizontal plane and the top portion is located above the first horizontal plane, the lower portion and the top portion formed as a single integral injection molded piece, the top portion and the lower portion in fixed relation to one another, the top portion fixedly attached to the frame and the lower portion fixedly attached to the frame, the lower portion of the single-piece hood extending downwardly to a position approximately equal to a bottom portion of the frame, wherein a parting line is located on a bottom portion of the single-piece hood.

20. The snowmobile of claim 19, wherein the parting line located on the bottom portion is a first parting line located on the bottom portion of the lower portion and a second parting line is located on the bottom portion of the top portion.

\* \* \* \* \*